US010203525B2

(12) United States Patent
Gill et al.

(10) Patent No.: US 10,203,525 B2
(45) Date of Patent: *Feb. 12, 2019

(54) EFFICIENT THERMO-OPTIC PHASE SHIFTERS USING MULTI-PASS HEATERS

(71) Applicant: International Business Machines Corporation, Armonk, NY (US)

(72) Inventors: Douglas M. Gill, South Orange, NJ (US); Chi Xiong, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/598,603

(22) Filed: May 18, 2017

(65) Prior Publication Data

US 2017/0255031 A1 Sep. 7, 2017

Related U.S. Application Data

(63) Continuation of application No. 14/933,409, filed on Nov. 5, 2015, now Pat. No. 9,684,191.

(51) Int. Cl.
*G02F 1/035* (2006.01)
*G02F 1/01* (2006.01)
*G02B 6/132* (2006.01)
*G02B 6/136* (2006.01)
*G02F 1/025* (2006.01)

(52) U.S. Cl.
CPC .......... *G02F 1/0147* (2013.01); *G02B 6/132* (2013.01); *G02B 6/136* (2013.01); *G02F 1/011* (2013.01); *G02F 1/025* (2013.01)

(58) Field of Classification Search
CPC ....... G02F 1/0147; G02F 1/011; G02B 6/132; G02B 6/136
USPC ........................................................ 385/1-3
See application file for complete search history.

(56) References Cited

U.S. PATENT DOCUMENTS

| 6,278,168 | B1 | 8/2001 | Day |
| 6,999,670 | B1 | 2/2006 | Gunn, III et al. |
| 7,304,799 | B2 | 12/2007 | Ma et al. |
| 7,333,679 | B2* | 2/2008 | Takahashi ............... G02F 1/011 385/1 |
| 7,359,607 | B2 | 4/2008 | Blalock et al. |
| 7,509,005 | B2 | 3/2009 | Sandhu et al. |

(Continued)

OTHER PUBLICATIONS

J. Van Campenhout et al., "Integrated NiSi waveguide heaters for CMOS-compatible silicon thermo-optic devices," Optics Letters, vol. 35, No. 7, Apr. 2010, pp. 1013-1015.

(Continued)

*Primary Examiner* — Ryan Lepisto
*Assistant Examiner* — Guy Anderson
(74) *Attorney, Agent, or Firm* — Vazken Alexanian; Michael J. Chang, LLC

(57) ABSTRACT

Techniques for increasing efficiency of thermo-optic phase shifters using multi-pass heaters and thermal bridges are provided. In one aspect, a thermo-optic phase shifter device includes: a plurality of optical waveguides formed in an SOI layer over a buried insulator; at least one heating element adjacent to the optical waveguides; and thermal bridges connecting at least one of the optical waveguides directly to the heating element. A method for forming a thermo-optic phase shifter device is also provided.

18 Claims, 7 Drawing Sheets

(56) References Cited

U.S. PATENT DOCUMENTS

| | | | |
|---|---|---|---|
| 7,630,596 B2* | 12/2009 | Watanabe | B81B 3/0081 |
| | | | 216/2 |
| 7,676,121 B2 | 3/2010 | Gill et al. | |
| 7,693,354 B2 | 4/2010 | Carothers | |
| 7,715,663 B2 | 5/2010 | Carothers | |
| 7,720,341 B2 | 5/2010 | Blalock et al. | |
| 7,805,026 B2 | 9/2010 | Gill | |
| 8,098,968 B2 | 1/2012 | Green et al. | |
| 8,148,265 B2 | 4/2012 | Carothers et al. | |
| 9,042,697 B2 | 5/2015 | Sandhu et al. | |
| 9,122,085 B2 | 9/2015 | Rasras | |
| 2008/0159681 A1 | 7/2008 | Gill et al. | |
| 2009/0003754 A1* | 1/2009 | Watanabe | B81B 3/0081 |
| | | | 385/1 |
| 2009/0016674 A1* | 1/2009 | Watanabe | G02B 6/136 |
| | | | 385/14 |
| 2010/0053712 A1 | 3/2010 | Carothers | |
| 2010/0054653 A1 | 3/2010 | Carothers | |
| 2010/0055906 A1 | 3/2010 | Carothers et al. | |
| 2010/0092682 A1 | 4/2010 | Carothers et al. | |
| 2015/0049338 A1 | 2/2015 | Wang et al. | |
| 2016/0109655 A1 | 4/2016 | Vurgaftman et al. | |
| 2016/0334648 A1* | 11/2016 | Lu | G02F 1/0147 |

OTHER PUBLICATIONS

M.A. Van Camp et al., "Demonstration of electrooptic modulation at 2165nm using a silicon Mach-Zehnder interferometer," Optics Express, vol. 20, No. 27, Dec. 2012, pp. 28009-28016.

N.C. Harris et al., "Efficient, compact and low loss thermo-optic phase shifter in silicon," Optics Express, vol. 22 No. 9, Apr. 2014, pp. 10487-10493.

List of IBM Patents or Applications Treated as Related (2 pages).

\* cited by examiner

EFFICIENT THERMO-OPTIC PHASE SHIFTERS USING MULTI-PASS HEATERS

CROSS-REFERENCE TO RELATED APPLICATION(S)

This application is a continuation of U.S. application Ser. No. 14/933,409 filed on Nov. 5, 2015, now U.S. Pat. No. 9,684,191, the disclosure of which is incorporated by reference herein.

FIELD OF THE INVENTION

The present invention relates to thermo-optic phase shifters, and more particularly, to techniques for increasing efficiency of thermo-optic phase shifters using multi-pass heaters and thermal bridges.

BACKGROUND OF THE INVENTION

Thermo-optic phase shifters control the properties of optical circuits by selectively heating sections of the optical circuit to control the optical phase of the light in the circuit. Thermo-optic phase shifters function by passing current through an integrated local resistor.

Thermo-optic phase shifters should have a relatively small footprint. The small foot print is needed because chips can experience thermal and stress gradients that can dynamically change the optical properties within waveguide circuits. The bigger the optical circuit footprint, the more susceptible it can be to dynamic temperature and strain profiles within the chip. This is particularly true in (but not limited to) circumstances where a single light source is split into two paths that are subsequently recombined to control the light through the optical circuit via optical interference.

An important aspect of the design of a thermo-optic phase shifters is to address the electromigration issue because thermo-optic phase shifters usually work with a significant electric current at elevated temperatures. Electromigration in a conductor is the result of momentum transfer from the electrons to the metal ions. Electromigration is a reliability concern with integrated circuits, especially those at scaled dimensions and high current densities, since excessive electromigration can lead to failures.

The efficiency of a thermo-optic phase shifter can be characterized by two figures-of-merit (FOM). The first FOM (FOM1) is the induced optical phase change by a certain heater power change. The second FOM (FOM2) is the induced optical phase change by a certain temperature change. Generally, the better the heater efficiency, the less heater power is needed and the less temperature excursion is required to meet a given thermo-optical phase shifter specification. Minimizing power consumption (maximizing FOM1) is important for scaling short reach link solutions, and large-scale thermal management within data centers and advanced computing systems. Minimizing the temperature excursions (maximizing FOM2) will improve the device's reliability in electromigration sensitive applications, because electromigration concerns scale exponentially with temperature.

Thermo-optic phase shifter configurations have been proposed to address these design considerations. For instance, U.S. Pat. No. 7,676,121 issued to Gill et al., entitled "Thermo-Optic Tuning of a Multi-Directional Optical Waveguide," proposes heating elements that are looped into different segments to heat the optical waveguides, with a goal towards increasing efficiency, minimizing power consumption, etc. However, the design proposed in U.S. Pat. No. 7,676,121 has some notable drawbacks. The heating element is a resistor wire placed far away from the waveguide which transfers heat to the waveguide through low thermal conductivity material—thereby compromising efficiency. Further, the optical waveguides in the heating elements all have the same cross sections, and the thermal loading and heat transfer efficiency is not well controlled.

Therefore, improved thermo-optic phase shifter designs would be desirable.

SUMMARY OF THE INVENTION

The present invention provides techniques for increasing efficiency of thermo-optic phase shifters using multi-pass heaters and thermal bridges. In one aspect of the invention, a thermo-optic phase shifter device is provided. The thermo-optic phase shifter device includes: a plurality of optical waveguides formed in a silicon-on-insulator (SOI) layer over a buried insulator; at least one heating element adjacent to the optical waveguides; and thermal bridges connecting at least one of the optical waveguides directly to the heating element.

In another aspect of the invention, a method for forming a thermo-optic phase shifter device is provided. The method includes the steps of: patterning a plurality of optical waveguides in an SOI layer over a buried insulator; forming at least one heating element adjacent to the optical waveguides; and forming thermal bridges connecting at least one of the optical waveguides directly to the heating element.

A more complete understanding of the present invention, as well as further features and advantages of the present invention, will be obtained by reference to the following detailed description and drawings.

DETAILED DESCRIPTION OF PREFERRED EMBODIMENTS

Figure 1:
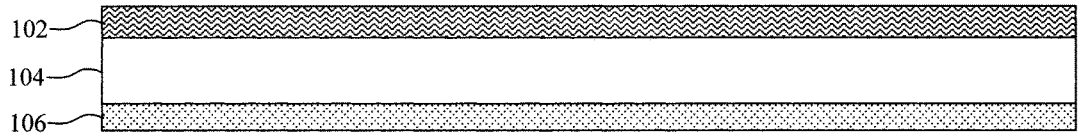
FIG. 1 is a cross-sectional diagram illustrating a starting platform for forming a thermo-optic phase shifter which includes a silicon-on-insulator (SOI) wafer having a SOI layer separated from a substrate by a buried insulator according to an embodiment of the present invention.

Provided herein are thermo-optic phase shifter designs wherein an additional waveguide(s) is/are placed next to the heating element to make use of heat that is not otherwise used. As will be described in detail below, some of the waveguides travel in different directions relative to the flow of current within the heater in a multi-pass design. By way of example only, several embodiments will be presented below. In a first exemplary embodiment, one or more waveguide sections within the thermo-optic phase shifter design are directly connected to the heating element through a thin thermal bridge (e.g., a silicon bridge, or other materials with relatively high thermal conductivity), for better heat transfer to the waveguide and overall efficiency. In a second exemplary embodiment, some of the waveguide sections within the thermo-optic phase shifter design are not directly connected to the heating elements thereby reducing heat flow to the handle wafer and increasing overall efficiency. This can be accomplished selectively to the design in the first embodiment, i.e., wherein the thin thermal bridges are selectively placed/removed for some of the waveguide sections. In a third exemplary embodiment, the thermal mass is reduced by removing some of the full silicon thickness sections within the thermo-optic phase shifter design, thereby increasing overall thermal efficiency. The thermal efficiency is optimized by achieving the largest optical phase shift possible for a given temperature change in the heater. In contrast, the power efficiency is optimized by achieving the maximum optical phase shift for a given amount of electrical power consumed.

Each of these exemplary embodiments will now be described in detail. As provided above, present techniques generally involve placing an additional waveguide or waveguides next to the heating element to better utilize the heat generated. This configuration is also referred to herein as a multi-pass heater design since the waveguides make multiple passes alongside each heating element, thereby increasing the interaction length for the same given heater power. This concept will become more apparent from the following description. In this first scenario, thin thermal bridges are used to directly connect one or more of the waveguides to the heating element to increase heat transfer therebetween. It is notable that while various designs are being presented in different exemplary embodiments, the configurations employed therein can be combined in a single thermo-optic phase shifter design. By way of example only, the thermal bridges (first embodiment) can be placed between select waveguides and the heating element leaving other waveguides not directly connected to the heating element (second embodiment) and/or the portions of the silicon within the phase shifter design can be selectively removed from adjacent to one or more of the waveguides (third embodiment). It is further notable that, according to an exemplary embodiment, the waveguides described herein are optical waveguides consisting of an optical core surrounded by an optical cladding material. For instance, the optical core is formed from a semiconductor material, such as silicon (Si), and the optical cladding is formed from an insulator, such as silicon dioxide ($SiO_2$). See, for example, U.S. Pat. No. 7,676,121, the contents of which are incorporated by reference as if fully set forth herein. As described in U.S. Pat. No. 7,676, 121, the optical core provides an optical path for photons to travel, and the optical cladding serves to confine the photons to the core.

The first exemplary embodiment is now described by way of reference to FIGS. 1-8. As shown in FIG. 1, the process begins with a silicon-on-insulator or SOI wafer. As is known in the art, an SOI wafer typically includes a SOI layer (e.g., SOI layer 102) separated from a substrate (e.g., substrate 106) by a buried insulator (e.g., buried insulator 104). When the buried insulator is an oxide (such as $SiO_2$), it is commonly referred to as a buried oxide or BOX.

Figure 2:
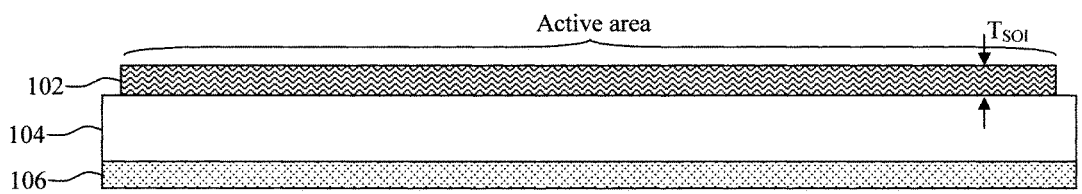
FIG. 2 is a cross-sectional diagram illustrating a full etch of the SOI layer having been performed to define at least one active area according to an embodiment of the present invention.

Next, at least one active area is defined in the SOI layer 102. See FIG. 2. Specifically, standard lithography and etching techniques can be used to pattern the SOI layer into at least one isolated active area in which the waveguides (and heating elements) will be formed. As shown in FIG. 2, isolation is achieved by fully-etching the SOI layer 102 down to the buried insulator 104.

Figure 3:
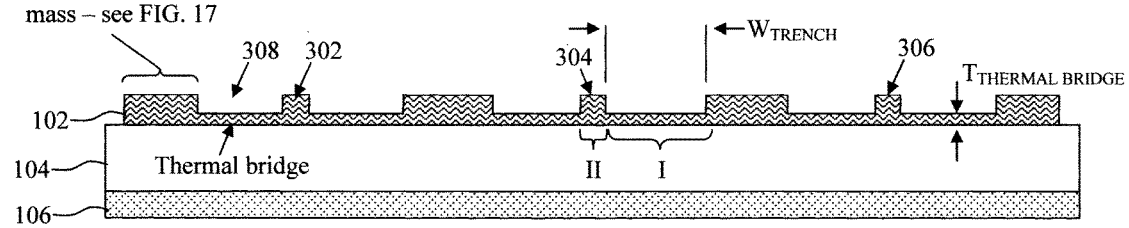
FIG. 3 is a cross-sectional diagram illustrating a partial etch of the SOI layer having been performed to form trenches in the SOI layer which define multiple waveguides (and thermal bridges) in the active area according to an embodiment of the present invention.
Figure 4:
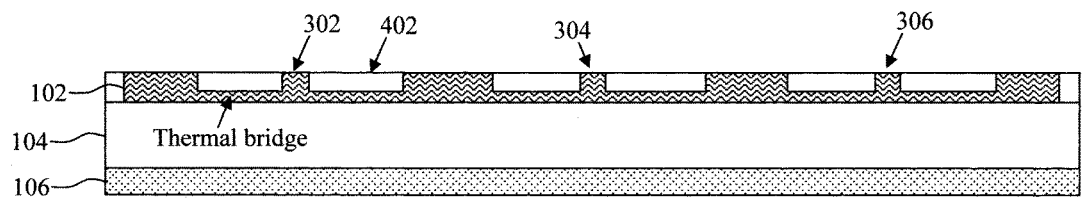
FIG. 4 is a cross-sectional diagram illustrating the trenches having been filled with an insulator according to an embodiment of the present invention.
Figure 5:
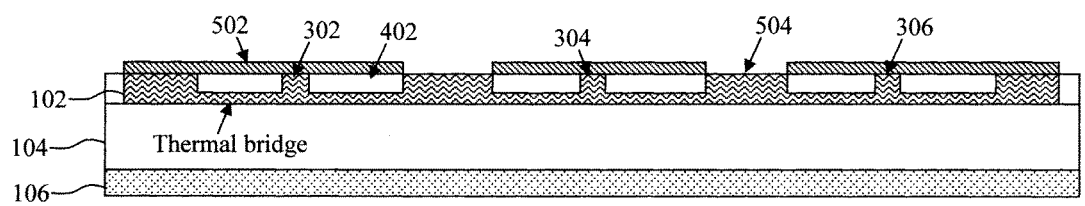
FIG. 5 is a cross-sectional diagram illustrating a mask having been formed covering all but those regions of the SOI layer in which a heating element will be formed according to an embodiment of the present invention.

A partial etch of the SOI layer 102 in the active area is then performed to form multiple waveguides 302, 304, 306, etc. in the active area. See FIG. 3. Again, standard lithography and etching techniques may be employed for this etching step. A partial etch (versus full etching—see FIG. 2) can be achieved, for example, using a timed etch wherein the etch is endpointed prior to fully etching the SOI layer 102. As shown in FIG. 3, this partial etch involves patterning trenches 308 in the SOI layer 102, wherein the trenches 308 define at least one first portion I and at least one second portion II of the SOI layer 102. As will be described in detail below (see, for example, the description of the third exemplary embodiment below), the first portion I of the SOI layer 102 defined by the trenches 308 can be selectively removed to reduce the thermal mass and thereby increase heater power efficiency. According to an exemplary embodiment, each of the trenches 308 has a width $W_{TRENCH}$ of from about 1 micrometer (μm) to about 2.5 μm, and ranges therebetween.

The second portion II of the SOI layer 102 defined by the trenches 308 will be used to form the waveguides 302, 304, 306, etc. As noted above, the trenches 308 extend only part way through the SOI layer 102. Another way to look at it is that, post-patterning of the trenches 308, there remains a portion of the SOI layer 102 separating the trenches 308 from the buried insulator 104. It is these remaining portions of the SOI layer 102 between the trenches 308 and the buried insulator 104 that will serve as the thin thermal bridges directly connecting the waveguides 302, 304, 306, etc. with the heating element (to be formed below). See FIG. 3. According to an exemplary embodiment, the SOI layer 102 has a starting thickness $T_{SOI}$ (see FIG. 2), and each of these thin thermal bridges will have a thickness $T_{THERMAL\ BRIDGE}$ (see FIG. 3) of from about 10% to about 70% and ranges therebetween, that of the $T_{SOI}$.

As provided above, the present waveguides are formed by surrounding the optical cores (in this case defined from the SOI layer 102) with an optical cladding material. In that regard, in order to isolate the individual waveguides 302, 304, 306, etc., the trenches 308 are next filled with an insulator 402. See FIG. 4. According to an exemplary embodiment, the insulator 402 is an oxide, such as $SiO_2$. The insulator 402 may be polished (e.g., using chemical mechanical polishing or CMP) to provide a planar surface. Shallow trench isolation or STI is a process used in the art to form isolation regions in a device structure. STI involves patterning trenches in an active layer, and then filling the trenches with an insulator such as an oxide—also commonly referred to as an STI oxide. Thus, the insulator 402 may herein also be called an STI oxide.

Next, the heater element is formed which, as will be described in detail below, involves a silicidation process. The process for forming a silicide thermal heater for a photonic device is described, for example, in U.S. Pat. No. 8,098,968 issued to Green et al., entitled "Silicide Thermal Heaters for Silicon-On-Insulator Nanophotonic Devices," the contents of which are incorporated by reference as if fully set forth herein. In general, the process involves depositing a suitable silicide metal followed by an anneal. The silicide will form wherever the metal is in contact with the semiconductor. A "silicide" traditionally referred to the silicidation product of a metal and Si. However the term "silicide" (as used herein) has taken on a broader scope, and encompasses semiconductors other than Si.

Suitable silicide metals include, but are not limited to, nickel (Ni), cobalt (Co), titanium (Ti), and combinations thereof. The silicidation anneal can be performed at a temperature of from about 300° C. to about 700° C., and ranges therebetween.

As highlighted above, the heater silicide will form wherever the (silicide) metal is in contact with the semiconductor. Thus, prior to depositing the metal, a mask 502 is formed covering those non-heater portions of the SOI layer 102 which will not be silicided, e.g., the waveguides 302, 304, 306, etc. See FIG. 5. According to an exemplary embodiment, mask 502 is formed from a nitride material, such as silicon nitride (SiN), which is blanket deposited onto the structure and then patterned using standard lithography and etching to form the silicidation mask 502. With the mask 502 in place, the silicide metal(s) can then be deposited onto the structure. Regions 504 of SOI layer 102 exposed through the mask 502 will be used to form the silicide heating elements. The process is self-aligned in the sense that the silicide metal(s) deposited through the mask 502 will only be in contact with regions 504 of SOI layer 102, and thus the silicide will only be formed in those (heater) regions (i.e., any metal deposited outside of the heater regions will be unreacted).

An anneal is then performed to form (silicide) heating elements 602. See FIG. 6. According to an exemplary embodiment, the heating elements each have a width $W_{HEATER}$ of from about 1.5 μm to about 2.5 μm, and ranges therebetween. An optical cladding 604 is then deposited onto and covering the heating elements 602 and waveguides 302, 304, 306, etc.

Figure 6:
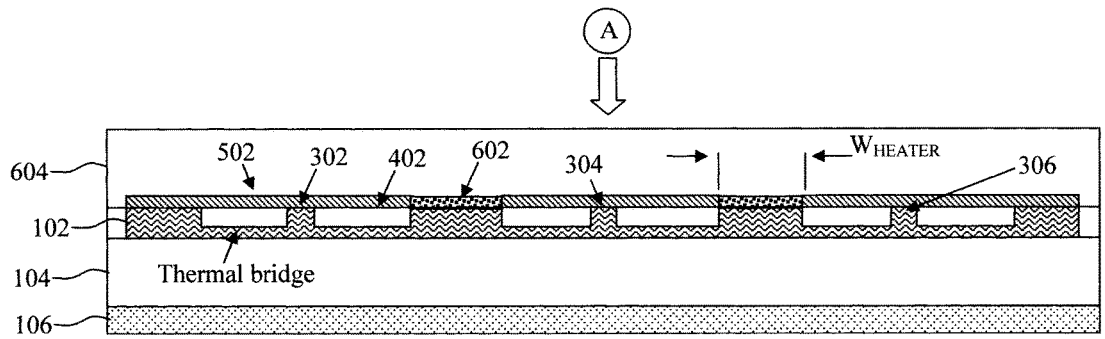
FIG. 6 is a cross-sectional diagram illustrating a silicide heating element having been formed and an optical cladding having been deposited onto and covering the heating element and waveguides to form the thermo-optic phase shifter according to an embodiment of the present invention.

As shown in FIG. 6, each of the waveguides 302, 304, 306, etc. is connected via a thermal bridge to the heating elements 602. As provided above, direct connection via these thermal bridges ensures better heat transfer from the heating elements to the waveguides thereby increasing overall efficiency of the device.

Figure 7:
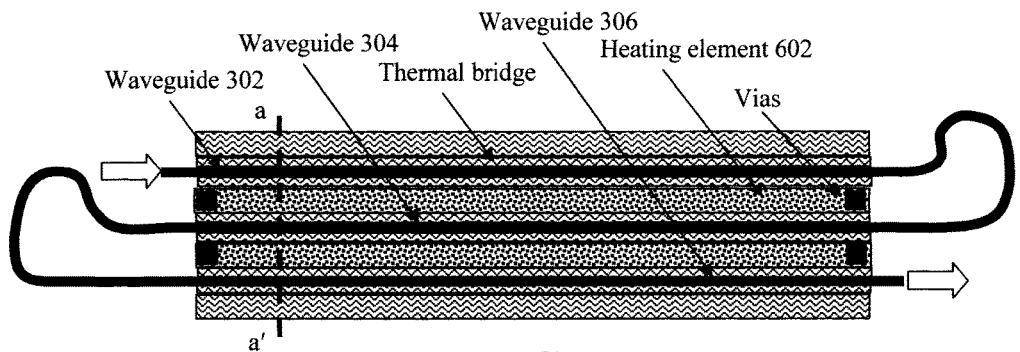
FIG. 7 is a top-down diagram of the thermo-optic phase shifter of FIG. 6 according to an embodiment of the present invention.

FIG. 7 provides a top-down view of the structure of FIG. 6 (i.e., from vantage point A—see FIG. 6). It is notable, however, that FIG. 6 (as well as the other cross-sectional views presented herein) are views of cuts taken along, e.g., line a-a'—see FIG. 7. Thus the view shown in FIG. 7 (and the other top-down views provided herein) is orthogonal to the view shown in FIG. 6 (and the other cross-sectional views provided herein). As shown in FIG. 7, a thermal bridge connects each of the waveguides 302, 304, 306, etc. to the heating elements 602. As shown in FIG. 7, access to the heating elements 602 (e.g., by a power supply) is achieved through a plurality of vias. Arrows are used to denote the path through the waveguides. Thus, as provided above, some of the waveguides travel in different directions relative to the flow of current within the heater in the present multi-pass design.

Figure 8:
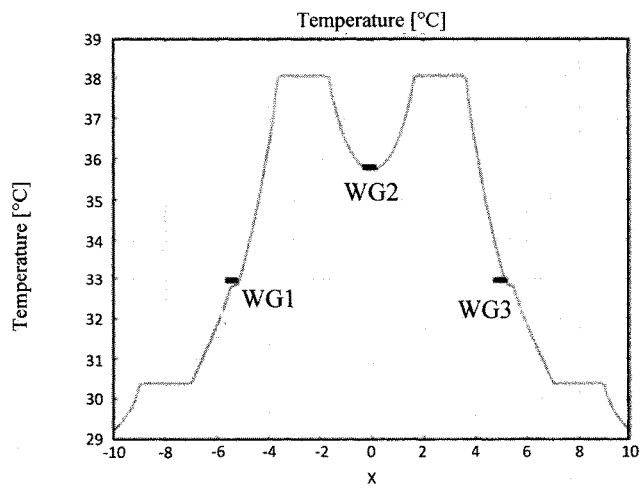
FIG. 8 is a simulated horizontal temperature profile of the thermo-optic phase shifter design of FIG. 7 according to an embodiment of the present invention.

FIG. 8 provides a simulated horizontal temperature profile along the center of the waveguides in this first exemplary embodiment (based, for example, on the thermo-optic phase shifter design shown in FIG. 7). In FIG. 8, the locations corresponding to the three waveguides 302, 304, 306 are marked with three rectangles, and labeled waveguide (WG) 1, 2, and 3, respectively. As shown in FIG. 8, for a given heater power the aggregate temperature increase in the present design in the three waveguides is 20.6° C., about twice that in a standard design (i.e., the temperature increase was simulated to be about 10° C. in the standard design). It is noted that the aggregate temperature increase is defined as the sum of the temperature change within the waveguides. The definition of aggregate temperature change assumes each waveguide near the heater has the same length.

While the above-described thermal bridges increase heat transfer between the heating element and the waveguides, they can also increase heat flow to the underlying wafer. Thus, as provided above, in a second exemplary embodiment of the present techniques, selective placement of the thermal bridges can be implemented such that some of the waveguide sections within the thermos-optic phase shifter design are not directly connected to the heating elements—thereby reducing heat flow to the handle wafer and increasing overall power efficiency. This second exemplary embodiment is now described by way of reference to FIGS. 9-15.

In this example, the process begins in the same general manner as above, i.e., with a starting SOI wafer. Thus, the preliminary steps are omitted here and reference may be made to the description (e.g., of FIG. 1) above for details. Further, like structures in the figures are numbered alike.

Figure 9:
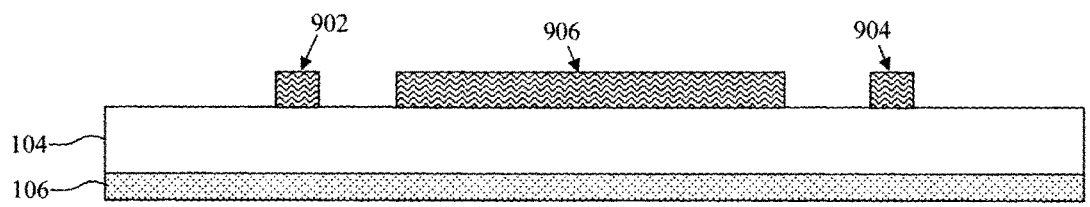
FIG. 9 is a cross-sectional diagram illustrating, according to an alternative embodiment, a full etch of the SOI layer having been performed to define at least one (isolated) waveguide in the SOI layer according to an embodiment of the present invention.
Figure 10:
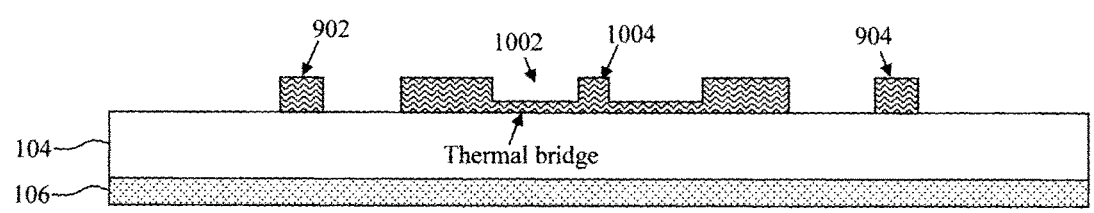
FIG. 10 is a cross-sectional diagram illustrating a partial etch of the SOI layer having been performed to form trenches which define at least one other waveguide in the SOI layer according to an embodiment of the present invention.
Figure 11:
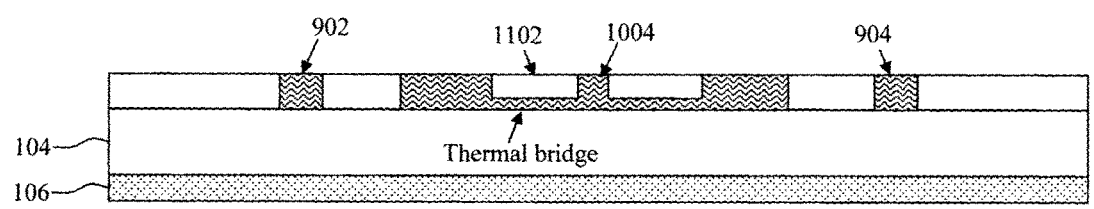
FIG. 11 is a cross-sectional diagram illustrating an insulator having been deposited onto the wafer surface, filling the trenches and other features according to an embodiment of the present invention.
Figure 12:
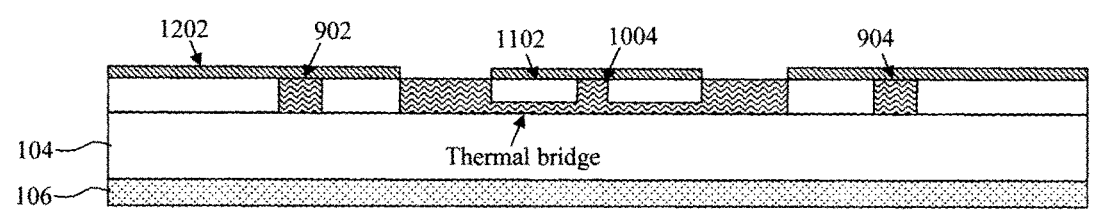
FIG. 12 is a cross-sectional diagram illustrating a mask having been formed covering all but those regions of the SOI layer in which a heating element will be formed according to an embodiment of the present invention.

As shown in FIG. 9, which in this example follows from FIG. 1, the SOI layer is first patterned. By contrast with the above process flow, here the SOI layer is fully etched to form at least one waveguide (in this example waveguides 902 and 904 in a first region(s) of the SOI layer) that are not connected to the heating element by a thermal bridge. Namely, by etching the SOI layer 102 down to the buried insulator 104 when forming waveguides 902 and 904, there is no remaining SOI in between these waveguides and/or connecting these waveguides to the heating elements (to be formed below). In between the waveguides 902 and 904 is a portion 906 of the SOI layer (i.e., in a second region of the SOI layer) that will be used to form another waveguide and the heating elements. However, by contrast to waveguides 902 and 904, the waveguide formed in portion 906 will be connected to the heating elements via thermal bridges. Exemplary thermal bridge thickness T values were provided above.

The portion 906 of the SOI layer 102 is then processed in a similar manner as described in the first embodiment above. Basically, in the same manner as described above, a partial etch is employed to form trenches 1002 extending part-way through the portion 906 of the SOI layer 102. As above, the trenches 1002 define at least one waveguide 1004 therebetween. Exemplary trench width ($W_{TRENCH}$) values were provided above. The portions of the SOI layer 102 remaining at the bottom of the trenches 1002 (i.e., separating the trenches 1002 from the buried insulator 104) serve as the thermal bridges. See FIG. 10.

An insulator 1102 (e.g., an STI oxide) is then deposited onto the wafer surface, filling the trenches 1002 and other features. See FIG. 11. The insulator 1002 may be polished (e.g., using CMP) to provide a planar surface.

Figure 13:
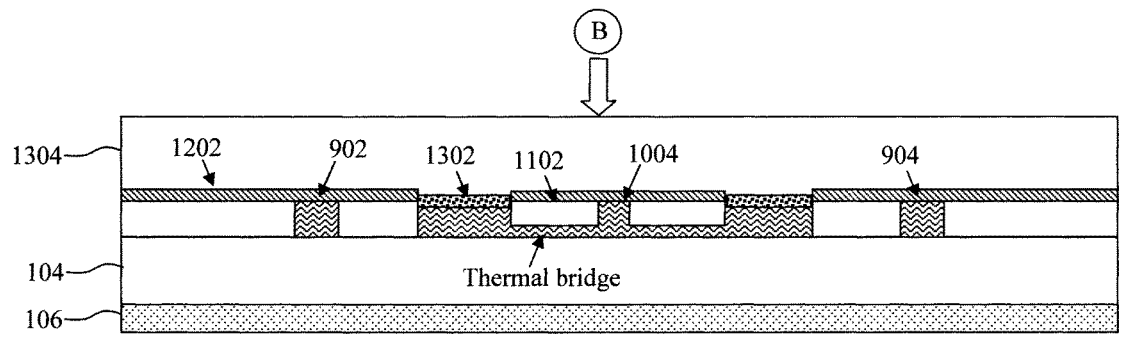
FIG. 13 is a cross-sectional diagram illustrating a silicide heating element having been formed and an optical cladding having been deposited onto and covering the heating element and waveguides to form the thermo-optic phase shifter according to an embodiment of the present invention.

Prior to depositing the (silicide) metal for heater element formation, a (e.g., SiN) mask 1202 is patterned covering all but those regions of the SOI layer 102 in which the heater elements will be formed. See FIG. 12. A silicide metal is then deposited and an anneal is used to form (silicide) heating elements 1302. See FIG. 13. As shown in FIG. 13, an optical cladding 1304 can be deposited onto and covering the heating elements 1302 and waveguides 902, 904, 1004, etc.

As is apparent from FIG. 13, only the center waveguide 1004 is directly connected (via a thermal bridge) to the heating elements 1302. To look at it another way, there are no thermal bridges connecting the peripheral waveguides 902, 904, etc. to the heating elements 1302. This configuration will serve to control the amount of heat transfer to the underlying substrate. In this case the footprint of the highly thermally conductive material is minimized such that only one optical waveguide has a thermal bridge to the heaters. In this way the heat transfer to the handle substrate is reduced, since the heat transfer to the substrate is somewhat proportional to the area of the material with a large thermal conductivity over the handle wafer. This design would be used when one wants to optimize the power efficiency of the heater, such that a minimal amount of power is required to create a given optical phase shift. In an alternate embodiment where the footprint of the material with high thermal conductivity is larger, the temperature increase in the heater will be reduced while still providing for an efficient optical phase shift, which is a design that would be used when electromigration concerns are most prominent.

Figure 14:
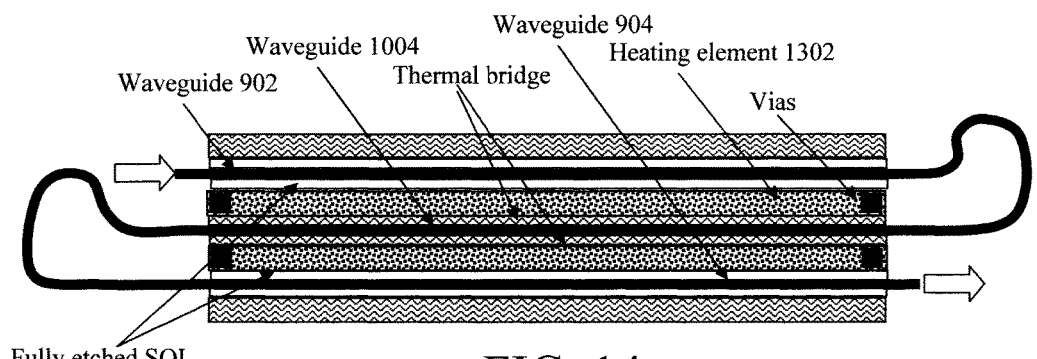
FIG. 14 is a top-down diagram of the thermo-optic phase shifter of FIG. 13 according to an embodiment of the present invention.

FIG. 14 provides a top-down view of the structure of FIG. 13 (i.e., from vantage point B—see FIG. 13). As shown in FIG. 14, a thermal bridge connects waveguide 1004 to the heating elements 1302, however the SOI layer 102 is fully etched between the waveguides 902 and 904 and the heating elements 1302, and therefore no thermal bridges exist there. As shown in FIG. 7 and as highlighted above, in this second exemplary embodiment additional waveguides are placed next to the center waveguide, but the waveguides are fully etched and not connected to the heating elements through thermal bridges. The thermal output of the heating elements is conducted to the side waveguides through the buried insulator 104, which has a low thermal conductivity. But the total silicon mass connected to the heating element, and the silicon area are both reduced so that the radiation to the substrate is reduced.

Figure 15:
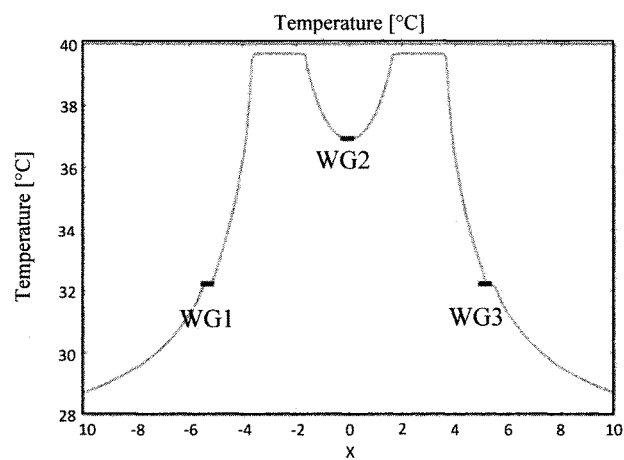
FIG. 15 is a simulated horizontal temperature profile of the thermo-optic phase shifter design of FIG. 14 according to an embodiment of the present invention.
Figure 16:
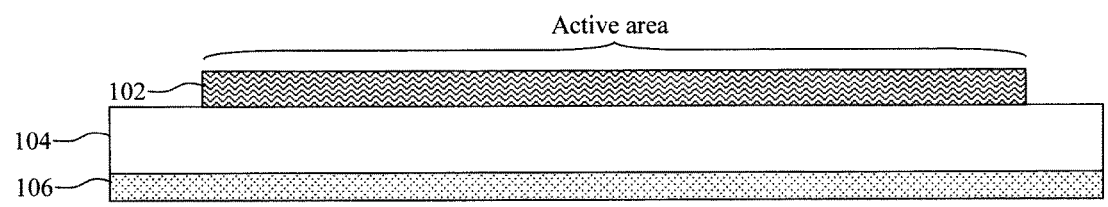
FIG. 16 is a cross-sectional diagram illustrating, according to an alternative embodiment, a full etch of the SOI layer having been performed to define at least one active area therein according to an embodiment of the present invention.

FIG. 15 provides a simulated horizontal temperature profile along the center of the waveguides in this second exemplary embodiment (based, for example, on the thermo-optic phase shifter design shown in FIG. 14). In FIG. 15, the locations corresponding to the three waveguides 902, 1004, 904 are marked with three rectangles, and labeled waveguide (WG) 1, 2, and 3, respectively. As shown in FIG. 15, the simulated aggregate temperature increase in the three waveguides is about 20.4° C.

Further steps can be taken to reduce the overall thermal mass of the design. For instance, in a third exemplary embodiment, all but the portions of the SOI layer used to form the waveguides, heating elements, and thermal bridges are removed. See, for example, FIGS. 16-22. In this example, the process begins in the same general manner as the first embodiment above, i.e., with a starting SOI wafer, etc. Thus, the preliminary steps are omitted here and reference may be made to the description (e.g., of FIG. 1) above for details. Again, like structures in the figures are numbered alike.

Figure 17:
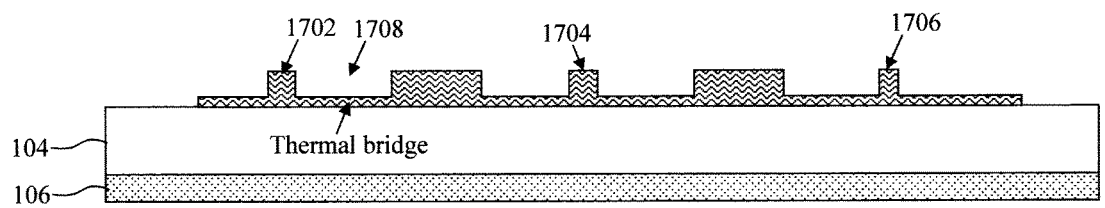
FIG. 17 is a cross-sectional diagram illustrating a partial etch of the SOI layer having been performed to form trenches in the SOI layer which define multiple waveguides (and thermal bridges) in the active area according to an embodiment of the present invention.
Figure 18:
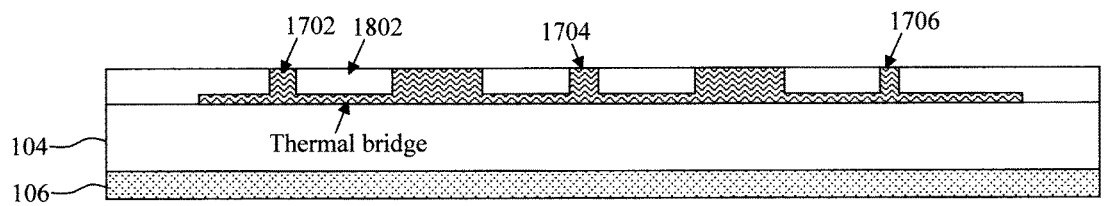
FIG. 18 is a cross-sectional diagram illustrating the trenches having been filled with an insulator according to an embodiment of the present invention.
Figure 19:
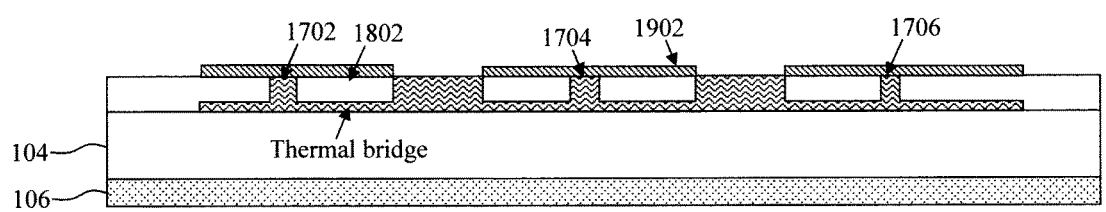
FIG. 19 is a cross-sectional diagram illustrating a mask having been formed covering all but those regions of the SOI layer in which a heating element will be formed according to an embodiment of the present invention.

In the same manner as described above, as shown in FIG. 16, which in this example follows from FIG. 1, the SOI layer is first fully etched to define at least one active area therein. By contrast with the first exemplary embodiment, the active area is defined here so as to encompass the footprint of only the waveguides, heating elements, and thermal bridges. Namely, post patterning, no portion of the SOI layer 102 will remain in the active area that is not a waveguide, heating element, or thermal bridge. For example contrast FIG. 17 with FIG. 3. In FIG. 3, there are unetched portions of the SOI layer 102 on the outer sides of the active area which do not contribute to forming a waveguide, heating element, or thermal bridge. In FIG. 17, these portions are removed to lower the overall thermal footprint of the design.

Specifically, as shown in FIG. 17, a partial etch is employed to form trenches 1708 extending part-way through the SOI layer 102 in the active area. As above, the trenches 1708 define at least one waveguide 1702, 1704, and 1706 therebetween. Exemplary trench width ($W_{TRENCH}$) values were provided above. The portions of the SOI layer 102 remaining at the bottom of the trenches 1708 (i.e., separating the trenches 1708 from the buried insulator 104) serve as the thermal bridges. See FIG. 17. Exemplary thermal bridge thickness T values were provided above.

An insulator 1802 (e.g., an STI oxide) is then deposited onto the wafer surface, filling the trenches 1708 and other features. See FIG. 18. The insulator 1802 may be polished (e.g., using CMP) to provide a planar surface.

Figure 20:
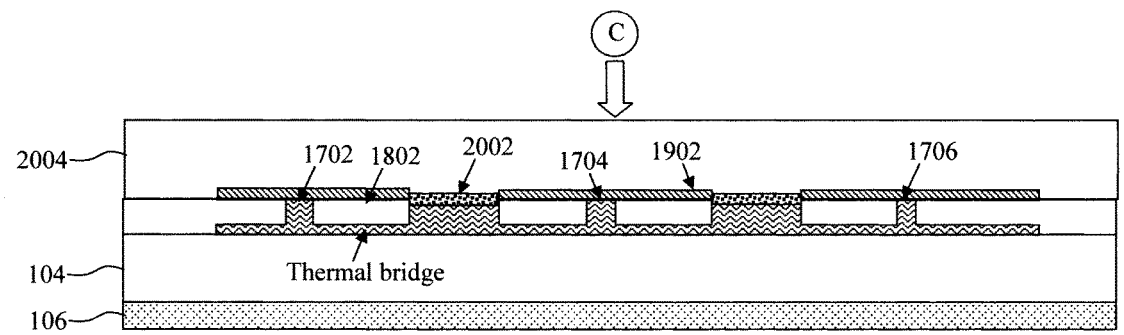
FIG. 20 is a cross-sectional diagram illustrating a silicide heating element having been formed and an optical cladding having been deposited onto and covering the heating element and waveguides to form the thermo-optic phase shifter according to an embodiment of the present invention.

Prior to depositing the (silicide) metal for heater element formation, a (e.g., SiN) mask 1902 is patterned covering all but those regions of the SOI layer 102 in which the heater elements will be formed. See FIG. 19. A silicide metal is then deposited and an anneal is used to form (silicide) heating elements 2002. See FIG. 20. As shown in FIG. 20, an optical cladding 2004 can be deposited onto and covering the heating elements 2002 and waveguides 1702, 1704, 1706, etc.

As shown in FIG. 20, like with the first exemplary embodiment—each of the waveguides 1702, 1704, and 1706 are directly connected to a heating element 2002 by a thermal bridge. In this case, however, no portion of the SOI layer 102 remains outside of the waveguides. This configuration will serve to minimize the thermal mass, and thereby increase the heater efficiency. It is notable, however, that there are some advantages to leaving these portions of the SOI layer in place. Namely, by doing so there is a smaller maximum heater temperature excursion because of the large SOI area, and thereby it may be better for electromigration sensitive applications.

Figure 21:
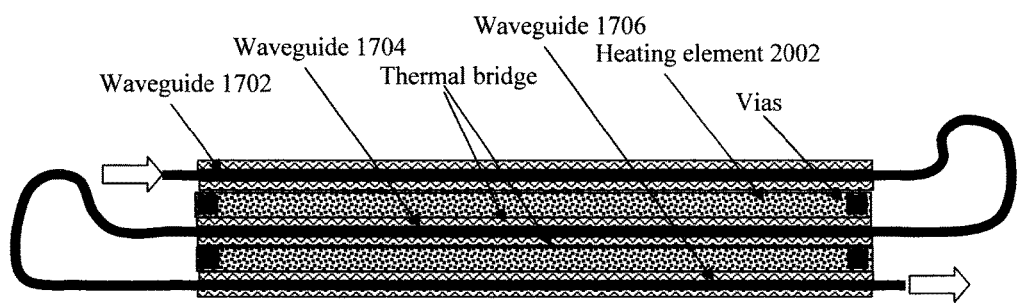
FIG. 21 is a top-down diagram of the thermo-optic phase shifter of FIG. 20 according to an embodiment of the present invention.

FIG. 21 provides a top-down view of the structure of FIG. 20 (i.e., from vantage point C—see FIG. 20). As shown in FIG. 21, the full silicon thickness ridges in the first embodiment which contribute to heat radiation loss to the substrate have been removed. And therefore, the heat efficiency is improved.

Figure 22:
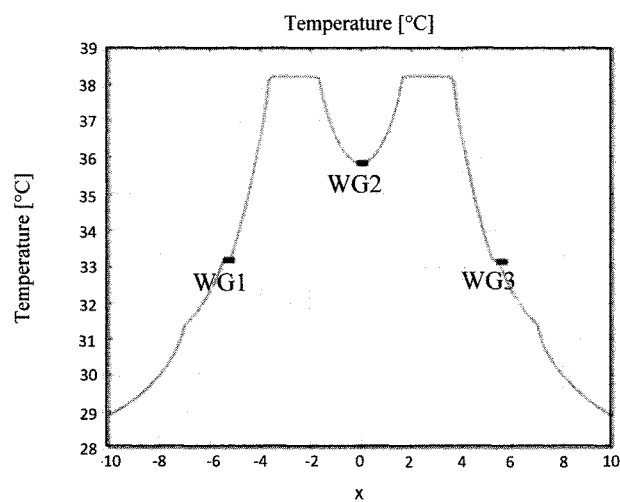
FIG. 22 is a simulated horizontal temperature profile of the thermo-optic phase shifter design of FIG. 21 according to an embodiment of the present invention.

FIG. 22 provides a simulated horizontal temperature profile along the center of the waveguides in this third exemplary embodiment (based, for example, on the thermo-optic phase shifter design shown in FIG. 21). In FIG. 22, the locations corresponding to the three waveguides 1702, 1704, 1706 are marked with three rectangles, and labeled waveguide (WG) 1, 2, and 3, respectively. As shown in FIG. 22, the simulated aggregate temperature increase in the three waveguides is about 21.3° C.

Several exemplary embodiments have been provided herein. Each embodiment provides notable advantages over a standard design. Further, some of the present embodiments might be preferable for a particular given application. By way of example only, the structure of the first embodiment in FIGS. 1-8 (as compared to that in the second embodiment—FIGS. 9-15) may be better for applications with significant electromigration concerns. The reason is that although the aggregate temperature increase (FOM1) is about the same in the first and the second embodiments, the maximum temperature excursion on the heater (FOM2) is smaller in the first embodiment (i.e., heat is conducted to the side waveguides through the bridges and the temperature is more balanced). The structure of the third embodiment in FIGS. 16-22 (as compared to that in the first embodiment—FIGS. 1-8) has a slightly higher heater efficiency (FOM1) and so it is good for lower power consumption. The structure in the second embodiment in FIGS. 9-15 has a slightly lower heater efficiency (FOM1) than the third embodiment in the current simulation. But the fully-etched side waveguides in the second embodiment give more design flexibility. For example, the fully-etched side waveguides in the second embodiment can be brought closer to the heaters because of tighter optical confinement, and thereby could outperform the structure in the third embodiment—FIGS. 16-22 in certain scenarios.

The thermal modeling results presented herein (see, for example, FIGS. 8, 15, and 22) suggest that the present multi-pass thermo-optic phase shifter is about twice as efficient as that of conventional designs. This means that the heating power can be cut by half while achieving the same amount of thermo-optic phase tuning, thereby greatly alleviating the electromigration, thermal management and reliability concerns.

Figure 23:
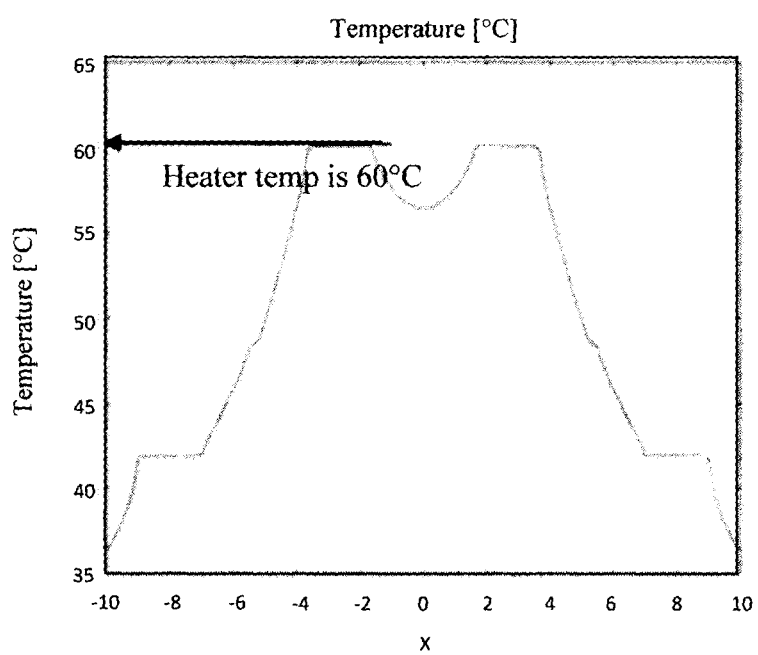
FIG. 23 is a simulated horizontal temperature profile of the present thermo-optic phase shifter design of FIG. 7 illustrating reduced heater temperatures (when compared to a conventional thermo-optic phase shifter design) thereby reducing electro-migration effects according to an embodiment of the present invention.

Advantageously, the present phase shifter design reduces the overall heater temperatures, and thereby reduces electromigration concerns. To test this parameter, the heater power was increased approximately five times thereby amplifying the difference in the heater temperature which can be enabled by the present multi-pass design (as compared to a conventional design). With the conventional design, this power increase resulted in heater temperatures as large as 70° C. By comparison, with the same increased heater power, the present design from the first embodiment (see above) resulted in lower heater temperatures (about 60° C.). See FIG. 23. As detailed above, in the first exemplary embodiment, the thermal mass near the heater is increased, as is the area of the footprint of the highly thermal conductive material, and so then is the thermal conduction to the substrate. Therefore, the steady state temperature of the heating element is reduced (thereby reducing electromigration effects) while simultaneously increasing the optical phase shift seen by the light in the waveguide for a given amount of heater power. Thus, the design reduces electromigration concerns and simultaneously increases heater efficiency. See FIG. 23.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for forming a thermo-optic phase shifter device, comprising the steps of:
    patterning a plurality of optical waveguides in a silicon-on-insulator (SOI) layer over a buried insulator;

forming at least one heating element adjacent to the optical waveguides;

forming thermal bridges connecting at least one of the optical waveguides directly to the heating element, wherein the method further comprises the steps of:

fully etching at least one first portion of the SOI layer in which at least another one of the optical waveguides is patterned, down to the buried insulator, disconnecting the at least another one of the optical waveguides from the heating element; and partially etching the SOI layer to form trenches in at least one second portion of the SOI layer, wherein the SOI layer that remains at bottoms of the trenches on the buried insulator forms the thermal bridges connecting the at least one of the optical waveguides directly to the heating element.

2. The method of claim 1, wherein the step of forming the at least one heating element comprises the steps of:

masking all but at least one given portion of the SOI layer in which the at least one heating element is formed with a mask;

depositing a metal through the mask; and annealing the device to react the metal with the given portion of the SOI layer to form a silicide which comprises the at least one heating element.

3. The method of claim 2, wherein the device is annealed at a temperature of from about 300° C. to about 700° C., and ranges therebetween.

4. The method of claim 2, wherein the mask comprises a nitride material.

5. The method of claim 2, wherein the metal comprises nickel, cobalt, or titanium.

6. The method of claim 2, wherein the silicide comprises nickel silicide, cobalt silicide, or titanium silicide.

7. The method of claim 1, wherein the heating element has a width of from about 1.5 μm to about 2.5 μm and ranges therebetween.

8. The method of claim 1, further comprising the step of:
depositing an optical cladding material covering the optical waveguides and the heating element.

9. The method of claim 8, wherein the optical cladding material comprises silicon dioxide.

10. The method of claim 1, further comprising the step of:
filling the trenches with an insulator.

11. The method of claim 10, wherein the insulator comprises an oxide material.

12. The method of claim 10, further comprising the step of:
polishing the insulator such that a top surface of the insulator is coplanar with a top surface of the SOI layer.

13. The method of claim 1, wherein each of the trenches has a width $W_{TRENCH}$ of from about 1 μm to about 2.5 μm, and ranges therebetween.

14. The method of claim 1, wherein the heating element is present between at least two of the optical waveguides.

15. The method of claim 1, wherein the SOI layer has a thickness $T_{SOI}$, and the thermal bridges each have a thickness $T_{THERMAL\ BRIDGE}$ of from about 10% to about 70%, and ranges therebetween, that of the $T_{SOI}$.

16. The method of claim 1, wherein only one of the optical waveguides is connected directly to the heating element by the thermal bridges.

17. The method of claim 16, wherein only an optical waveguide at a center of the thermo-optic phase shifter device is directly connected to the heating element by the thermal bridges.

18. The method of claim 1, further comprising the step of:
forming a plurality of vias in contact with the at least one heating element.

* * * * *